(12) United States Patent
Oddsen, Jr.

(10) Patent No.: US 6,273,383 B1
(45) Date of Patent: Aug. 14, 2001

(54) ARM APPARATUS FOR MOUNTING ELECTRONIC DEVICES, AND METHOD OF MAKING AND USING THE SAME

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 09/474,936

(22) Filed: Dec. 30, 1999

Related U.S. Application Data

(60) Provisional application No. 60/156,187, filed on Sep. 27, 1999.

(51) Int. Cl.[7] .................................................. E04G 3/01
(52) U.S. Cl. ...................................... 248/286.1; 248/284.1
(58) Field of Search .......................... 248/286.1, 282.1, 248/283.1, 276.1, 274.1, 284.1

(56) References Cited

U.S. PATENT DOCUMENTS

| | | | |
|---|---|---|---|
| 3,131,900 | 5/1964 | Anderson et al. | 248/210 |
| 3,424,419 | 1/1969 | Siegel | 248/226 |
| 3,489,383 | 1/1970 | Anson | 248/226 |
| 4,821,159 | 4/1989 | Pike | 62/285 |
| 4,852,842 | 8/1989 | O'Neill | 248/280.1 |
| 5,174,531 | * 12/1992 | Perakis | 248/286.1 |
| 5,390,685 | * 2/1995 | McCoy | 248/286.1 |
| 5,437,427 | * 8/1995 | Johnson | 248/286.1 |
| 5,584,596 | 12/1996 | Greene | 403/55 |
| 5,642,819 | 7/1997 | Ronia | 211/86.01 |
| 5,664,750 | 9/1997 | Chen | 248/231.71 |
| 5,743,503 | 4/1998 | Voeller et al. | 248/284.1 |
| 6,076,785 | 6/2000 | Oddsen, Jr. | 248/118.3 |
| 6,179,263 | * 1/2001 | Rosen et al. | 248/286.1 |

* cited by examiner

Primary Examiner—Ramon O. Ramirez
Assistant Examiner—J. DeLuca
(74) Attorney, Agent, or Firm—Lerner, David, Littenberg, Krumholz & Mentlik, LLP

(57) ABSTRACT

A relatively light weight, high strength, low cost extension arm suitable for mounting an electronic device, such as a computer monitor or television, while hiding the cables to and from the device within the extension arm is provided. The extension arm comprises an arm mount, a main arm and a forearm extension. Each of these components includes at least one plate and one tube, preferably made of steel or other rigid material, connected together, preferably by welding. The components are then covered with a finishing material, such as plastic, by, for example, cast molding to provide a finished look. The main arm is rotatably and slidably connected to the arm mount and the forearm extension is rotatably connected to the main arm. Each of the tubes is hollow so that cables to and from the device can travel therethrough. Moreover, the plastic is cast mold so as to form a channel on the plates through which the cables can travel. The cables can be hidden within the channels by placing a removable channel cover over the channels. A device mount can be rotatably connected to the forearm extension.

64 Claims, 14 Drawing Sheets

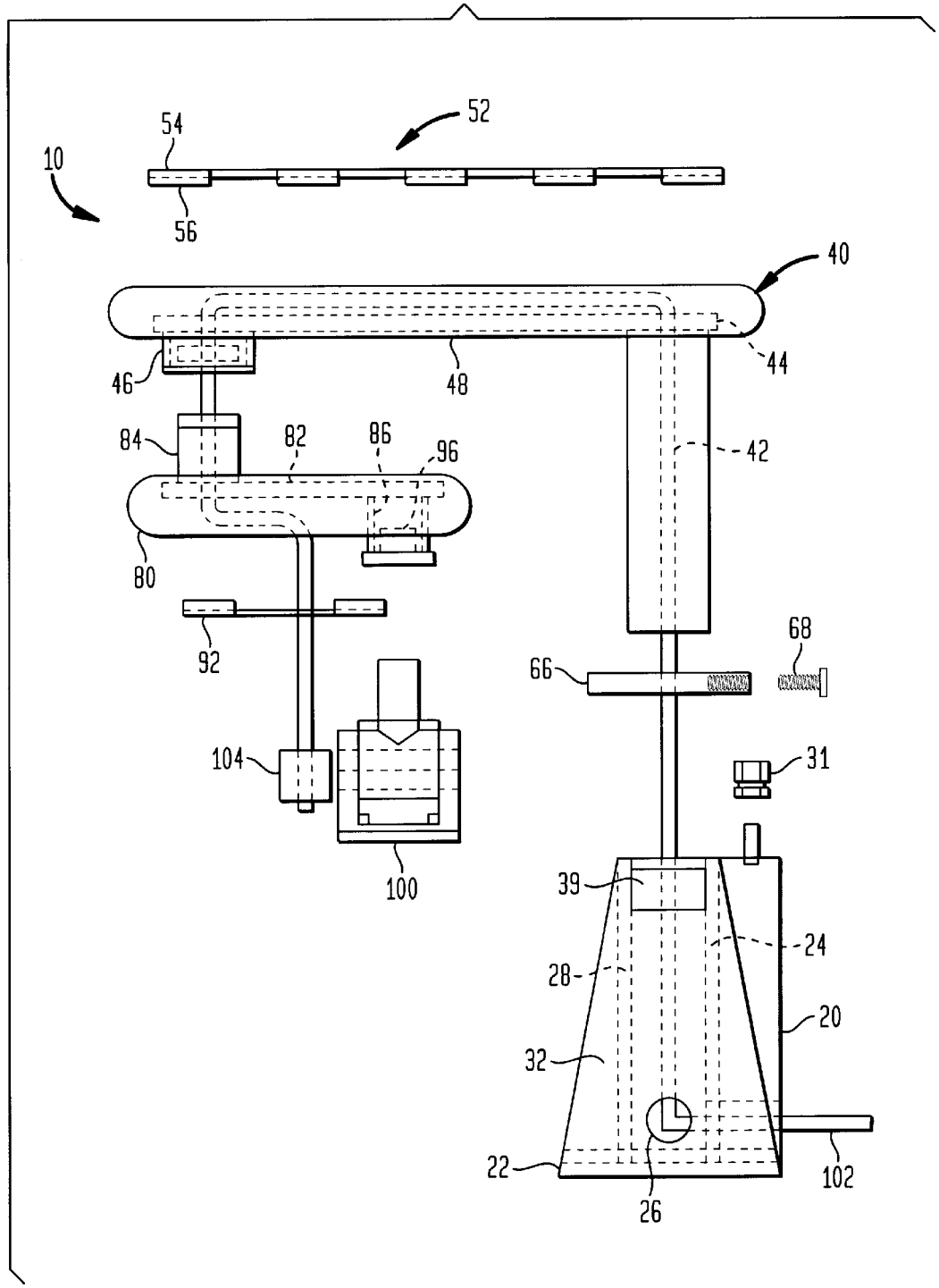

ARM APPARATUS FOR MOUNTING ELECTRONIC DEVICES, AND METHOD OF MAKING AND USING THE SAME

This application claims priority from Provisional Application No. 60/156,187 filed on Sep. 27, 1999.

FIELD OF THE INVENTION

This invention relates to an extension arm apparatus for mounting electronic devices, and more specifically to an extension arm that can house the cables to and from the electronic devices within the extension arm.

BACKGROUND OF THE INVENTION

Adjustable extension arms for mounting electronic devices, such as computer monitors or televisions, are well known in the prior art. The extension arms normally include a plurality of arms connected together so that an electronic device mounted thereto can be adjusted with respect to all three axis. That is the device may have a first arm pointing in the x-direction, a second arm pointing in the y-direction connected to the first arm, and a third arm pointing in the z-direction connected to the second arm. The arms are usually made of a rigid material, such as steel, so that they can support the weight of an electronic device mounted thereto. Manufacturing the extension arm from steel produces an extension arm that is relatively heavy. Moreover, as steel is relatively expensive, it follows that the cost of the extension arm is also relatively expensive. Furthermore, manufacturing an extension arm from steel requires additional manufacturing steps, such as painting, in order to produce a product with a finished look.

Alternatives to steel, such as plastic, have been considered, but have been rendered not practical because these materials do not have the required strength necessary for an extension arm. Thus, there is a need for an extension arm that is strong enough to support the weight of electronic devices that will be mounted thereto, but that is cheaper and less expensive than steel. Moreover, it would desirable for the extension arm to be able to house the cables for an electronic device therewithin and provide easy access to the cables. Furthermore, it would also be desirable for the extension arm to be able to be manufactured with a finished look with minimal or no manufacturing steps purely associated with providing the finished look.

SUMMARY OF THE INVENTION

The present invention, in accordance with one embodiment, relates to an extension arm that can be manufactured at a low cost while maintaining a high strength. The extension arm is inexpensive and easy to manufacture and assemble, and permits cables to and from an electronic device to be housed therein.

According to one embodiment, the extension arm consists of an arm mount, a main arm, and a forearm extension. Each of these components includes at least one plate and one tube, each made of a rigid material, such as steel, and connected together by, for example, welding. The diameter of the tubes is large enough so that power and data cables can fit therewithin. Each of these components is then coated with a finishing material, such as plastic, to provide a finished look. Preferably, the finishing material is applied to the components by cast molding. Advantageously, the finishing material creates a channel on one side of the plates, which can be used to house cables. In order to be able to hide the cables within the channel from view while providing easy access to them, it is preferable to have a removable channel cover placed over the channels.

This embodiment provides an extension arm that has the required strength to support electronic devices, has a finished look, and can hide cables therewithin. That is, the steel within the extension arm provides the necessary strength while the plastic provides the finished look. Since, the entire arm is not made of steel the weight of the extension arm as well as the cost is greatly reduced. Moreover, the cost is reduced because the manufacturing required to provide a finished look is significantly reduced.

According to one embodiment, the arm mount includes a first tube connected perpendicular to a first plate by, for example, welding. The first tube has a hole formed therein so that cables can be inserted in the hole and travel through the interior of the tube. The mount is then coated with the finishing material, such as plastic, to give it a finished look.

According to one embodiment, the main arm includes a second tube, a second plate and a third tube. The second plate has holes formed in each of two opposite sides. The second tube is connected to the second plate so that an inner diameter of the second tube is aligned with one of the holes. The third tube is connected to the second plate so as to be aligned with the other hole. The main body is then coated with the finishing material to provide a finished look and a first channel above a surface of the second plate upon which a cable can travel. A first channel cover is provided to place over the first channel so as to hide the cables therein.

According to one embodiment, the forearm extension includes a fourth tube, a third plate and a fifth tube. The third plate has holes formed in each of two opposite sides. The fourth tube is connected to the third plate so that an inner diameter of the second tube is aligned with one of the holes. The fifth tube is connected to the third plate so as to be aligned with the other hole. The forearm extension is then coated with a finishing material to provide a finished look and a second channel above a surface of the third plate upon which a cable can travel. A second channel cover is provided to place over the second channel so as to hide the cables therein.

According to one embodiment, the second tube has a diameter that is less than the diameter of the first tube so that it can be placed within the first tube. The second tube has a height control device, such as a collar, adjustably connected to an outer surface thereof. The height control device has a diameter that is greater than the diameter of the first tube so that it rests upon the top of the first tube when it comes in contact with the first tube. That is, the height control device prevents the second tube from entering further into the first tube and thus maintains the second tube at a set height. The second tube can rotate within the first tube.

According to one embodiment, the fourth tube has a diameter that is less than the diameter of the third tube so that it can be placed within the tube. The fourth tube has a slot formed in an outer surface thereof and the third tube has a lip formed in an inner surface thereof so that the third and fourth tubes can be locked together while still allowing the fourth tube to rotate within the third tube.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 1 is a cross sectional assembly view of an extension arm, in accordance with one embodiment;

DETAILED DESCRIPTION OF THE PREFERRED EMBODIMENTS

Figure 2A:
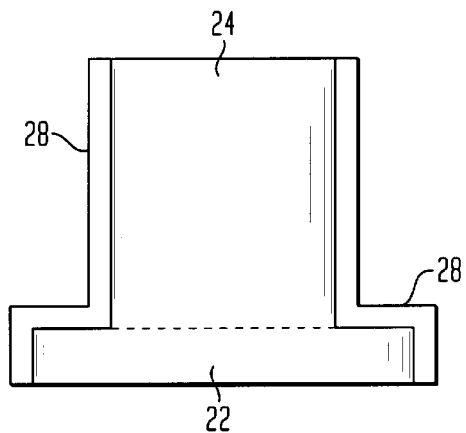
FIGS. 2(a) and 2(b), respectively illustrate a front and top view of one embodiment of an arm mount for the extension arm illustrated in FIG. 1.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, the present invention relates to a lightweight, high strength, and low cost extension arm 10 suitable for mounting electronic devices, such as a computer monitor or television. As illustrated in FIG. 1, the extension arm 10 comprises an arm mount 20, a main arm 40, and a forearm extension 80. The main arm 40 is slidably and rotatably connected to the arm mount 20. The forearm extension 80 is rotatably connected to the main arm 40. The arm mount 20 may be mounted to a mounting surface 106, such as a desk, directly or via a mounting device 108. A device mount 100, such as a tilter, may be rotatably connected to the forearm extension 80.

The arm mount 20 includes a first plate 22 constructed of a rigid material, such as steel, that is used as the base of the arm mount 20. A first tube 24 constructed of a rigid material, such as steel, is connected to the first plate 22, by for example, welding. The first tube 24 extends perpendicular from the first plate 22 and is centered on the first plate 22 so that the first plate 22 provides a base of support for the extension arm 10. The first tube 24 has a hole 26 formed therein. Preferably, the hole 26 is formed near an end of the first tube 24 that is connected to the first plate 22. Advantageously, the hole 26 will be large enough that standard data and power cables 102 and connectors 104 will be able to fit therethrough. For example, a standard data cable for a computer is a 15-pin mini-din connector, therefore the hole 26 should be large enough to fit a 15-pin mini-din connector.

To give the arm mount 20 a finished look, the arm mount 20 should be coated with a finishing material 28, such as plastic, zinc or aluminum, with plastic being a preferred material. The finishing material 28 may be applied in numerous ways, with the preferred method being to cast mold the finishing material 28 on the arm mount 20. Cast molding the finishing material 28 allows the finishing material 28 to take on a predefined shape. For example, the cast mold can be designed so as not to coat certain portions, to lightly coat other portions, and to heavily coat other portions. The finishing material 28 should have a hole aligned with the hole 26.

Figure 2B:
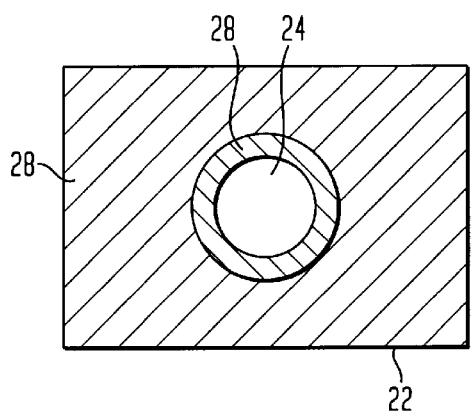
Figure 3A:
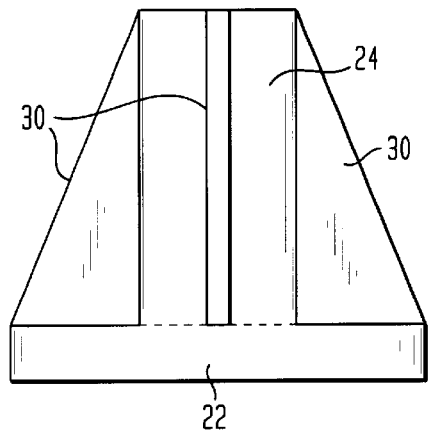
FIGS. 3(a) and 3(b) respectively illustrate a front and top view of one embodiment of an arm mount for the extension arm illustrated in FIG. 1.
Figure 3B:
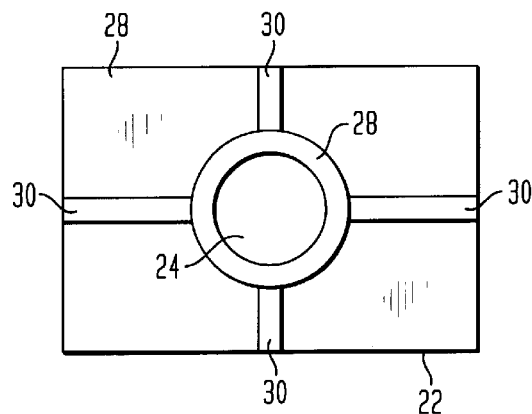
Figure 4A:
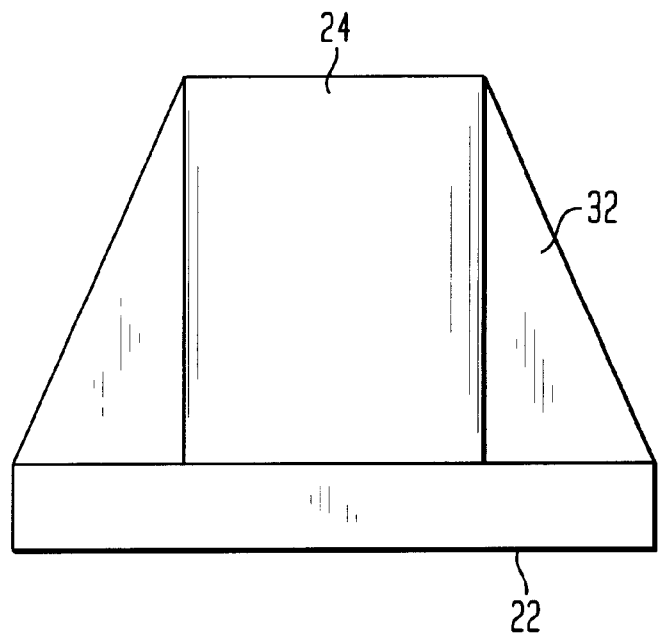
FIGS. 4(a) and 4(b) respectively illustrate a front and top view of one embodiment of on arm mount for the extension arm illustrated in FIG. 1.
Figure 4B:
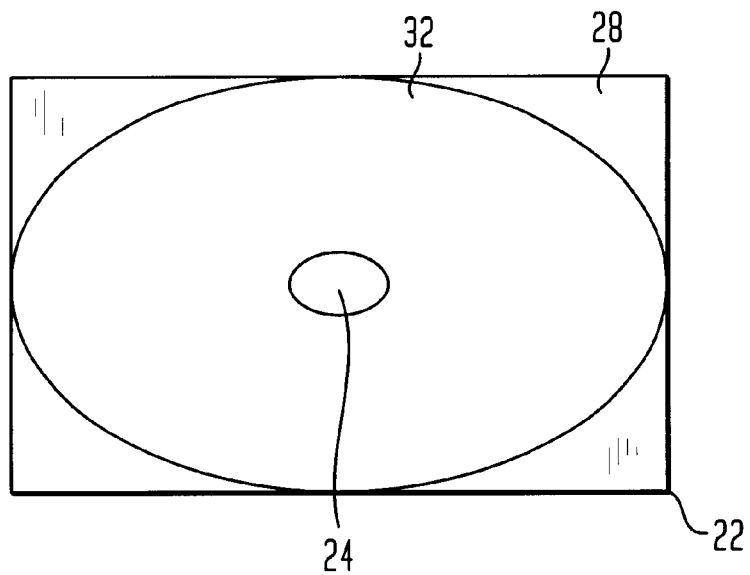

FIGS. 2(a) and 2(b) illustrate a front and top view of one embodiment of the arm mount 20 in which the finishing material 28 is evenly applied. That is, the same amount of finishing material 28 is applied to all surfaces of the first plate 22 and the first tube 24. FIGS. 3(a) and 3(b) illustrate a front and top view of one embodiment of the arm mount 20 in which the finishing material 28 includes a plurality of fins 30 that extend from an upper end of the first tube 24 to an edge of the first plate 22. The fins 30 would provide additional support for the first tube 24. FIGS. 4(a) and 4(b) illustrate a front and top view of one embodiment of the arm mount 20 in which the finishing material 28 extends from the entire circumference of the first tube 24 toward an outer edge of the first plate 22 so as to form a cone 32 (excluding the point). As with the fins 30, the cone 32 would provide additional support for the first tube 24. Moreover, the cone 32 provides a more aesthetic finished look. It should be noted, that while the first plate 22 is illustrated as having a generally square shape in FIGS. 2–4, it is not limited to a square shape and may be any shape that would provide the required support for the first tube 24.

Figure 5A:
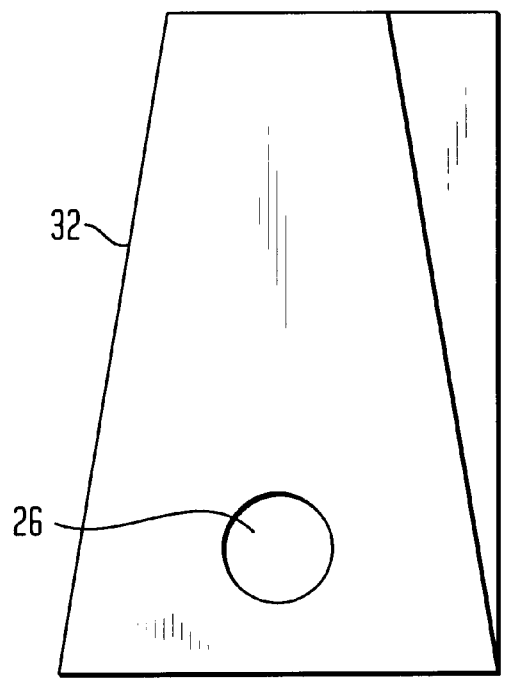
FIGS. 5(a) and 5(b) illustrate a side view and a bottom view of one embodiment of the coating of the arm mount.
Figure 5B:
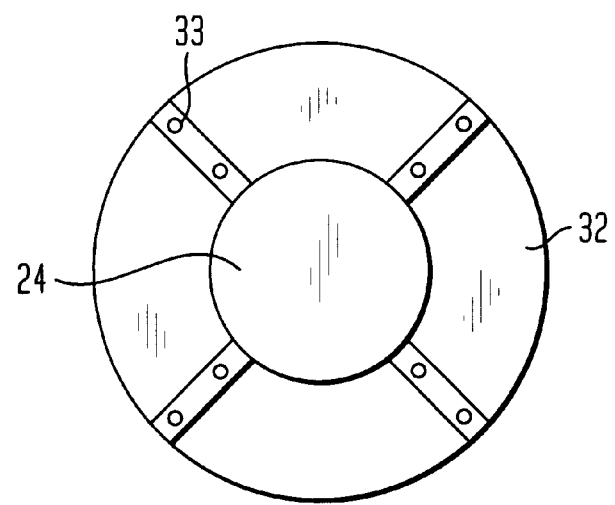
Figure 6A:
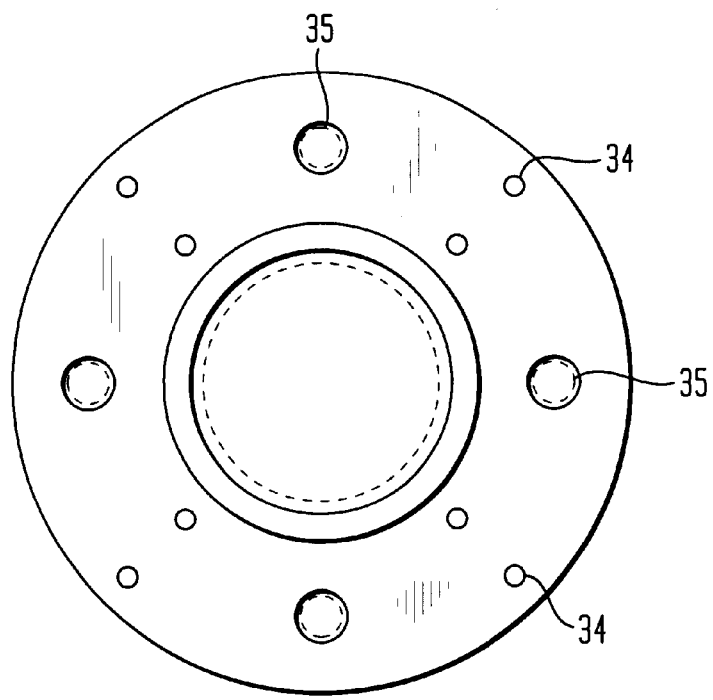
FIGS. 6(a) and 6(b) illustrate a front view and bottom view respectively of one embodiment of the arm mount.

A relatively thick layer of the finishing material 28 would be required to produce the cone 32. As one skilled in the art knows, plastic shrinks when it is cooled. Thus, if the cone 32 was cast molded from plastic, the plastic would shrink and possibly deform the cone 32. As such, when relatively thick layers of plastic are required, as would be the case if the cone 32 was plastic, an alternative to cast molding is desired. One alternative would be to pre-form the cone 32 and then attach the cone 32 to the arm mount 20. It is possible for the cone 32 to be either solid plastic or to be hollow. A preferred method for attaching the cone 32 to the arm mount 20 is to sonic weld the cone 32 thereto. As illustrated in FIG. 5(b), which is a bottom view of the cone 32, the cone 32 could have points 33 protruding from a lower surface. As illustrated in FIG. 6(a), the first plate 22 would have holes 34 formed therein that are aligned with the points 33 so as to receive the points 33 when the cone 32 is placed over the first tube 24 and the first plate 22. Once the cone 32 is in place and the points 33 are located within the holes 34, the points 33 can be heated up so as to deform (i.e., melt) within the holes 34. Thus, the cone 32 is secured in place by the connection between the points 33 and the holes 34. One skilled in the art would recognize that there are other methods available that would provide a secure connection between the cone 32 and the arm mount 20 that are well within the scope of the current invention.

Figure 6B:
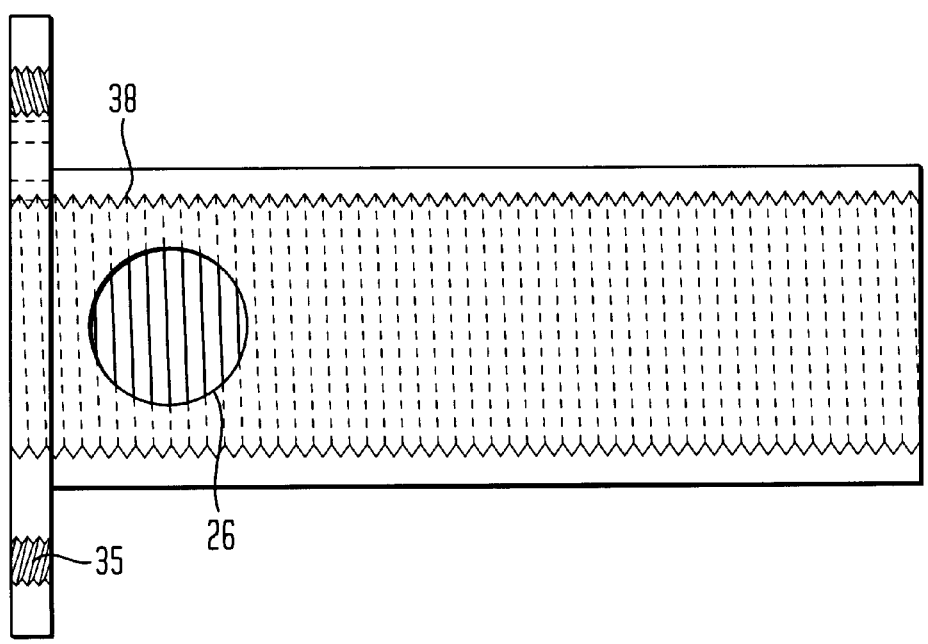
Figure 7:
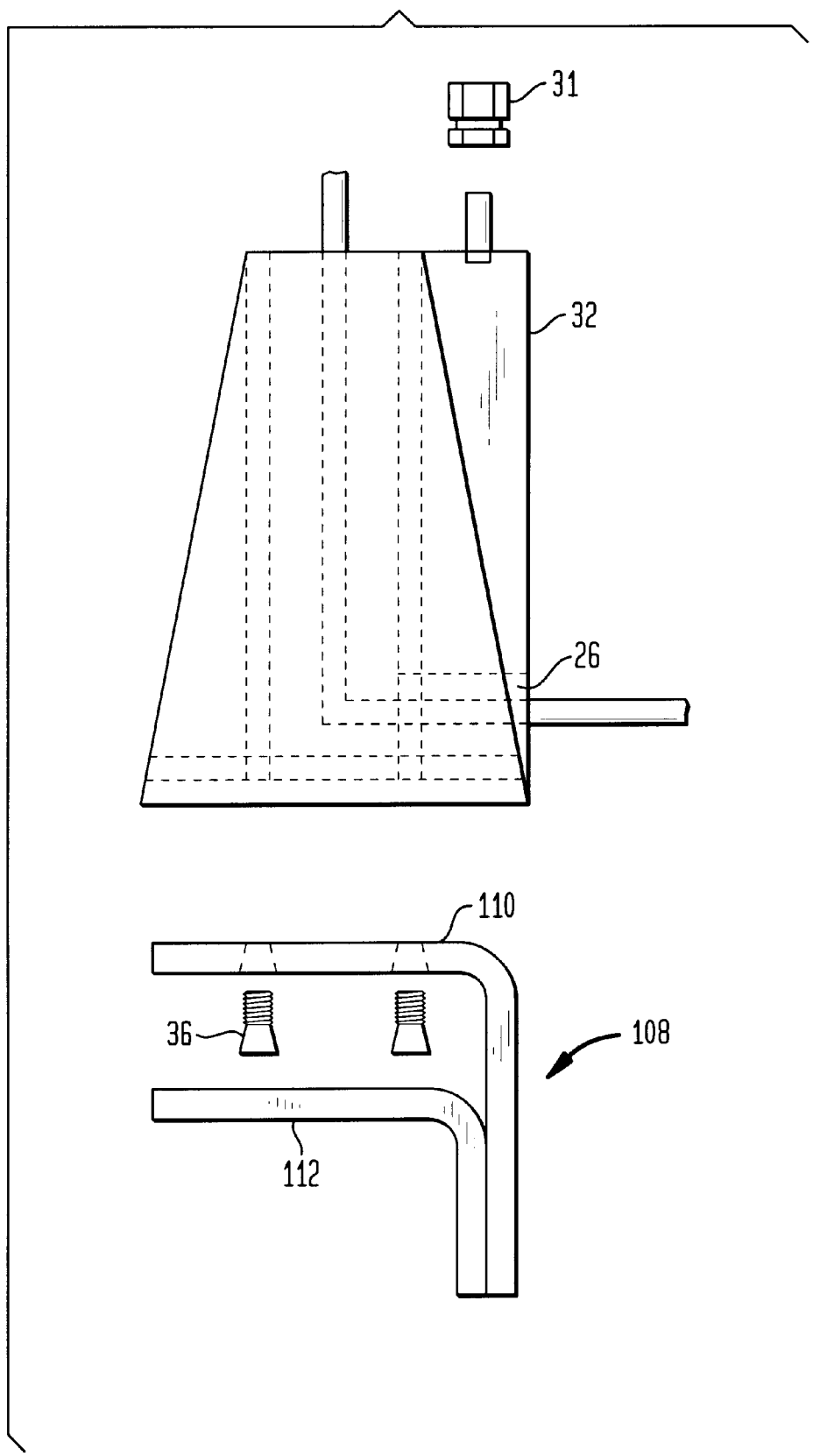
FIG. 7 illustrates a front view of one embodiment of a mounting device.

As illustrated in FIGS. 6(a) and 6(b), the first plate 22 may have threaded holes 35 formed therethrough. The threaded holes 35 would be to receive screws 36, so as to connect to the extension arm 10 to the mounting surface 106, for example, a desk, or the mounting device 108, such as a clamp. That is, the screws 36 may be screwed directly into the mounting surface 106 or may be screwed into the mounting device 108 which is in turn connected to the mounting surface 106 via another means. FIG. 7 illustrates one embodiment of a mounting device 108 that could be used to connect the extension arm 10 to the mounting surface 106. The mounting device 108 includes two brackets 110, 112, such as L-shaped brackets. The upper bracket 110 connects to a lower surface of the first plate 22 by, for example, screws 36. The upper bracket 110 is then placed on an upper surface of the mounting surface 106. The lower bracket 112 is then placed on a lower surface of the mounting surface 106. The two brackets 110, 112 are then tightened together and against the respective surface of the mounting surface 106 by a tightening means (not illustrated) to lock the extension arm 10 in place on the mounting surface 106. One skilled in the art would recognize that the tightening means could be a clamp, a gear, or one of various different devices, all of which would be within the scope of the current invention. Moreover, one skilled in the art would recognize that the mounting device 108 is not limited to a pair of brackets, and that various other configurations would be within the scope of the present invention.

Figure 8:
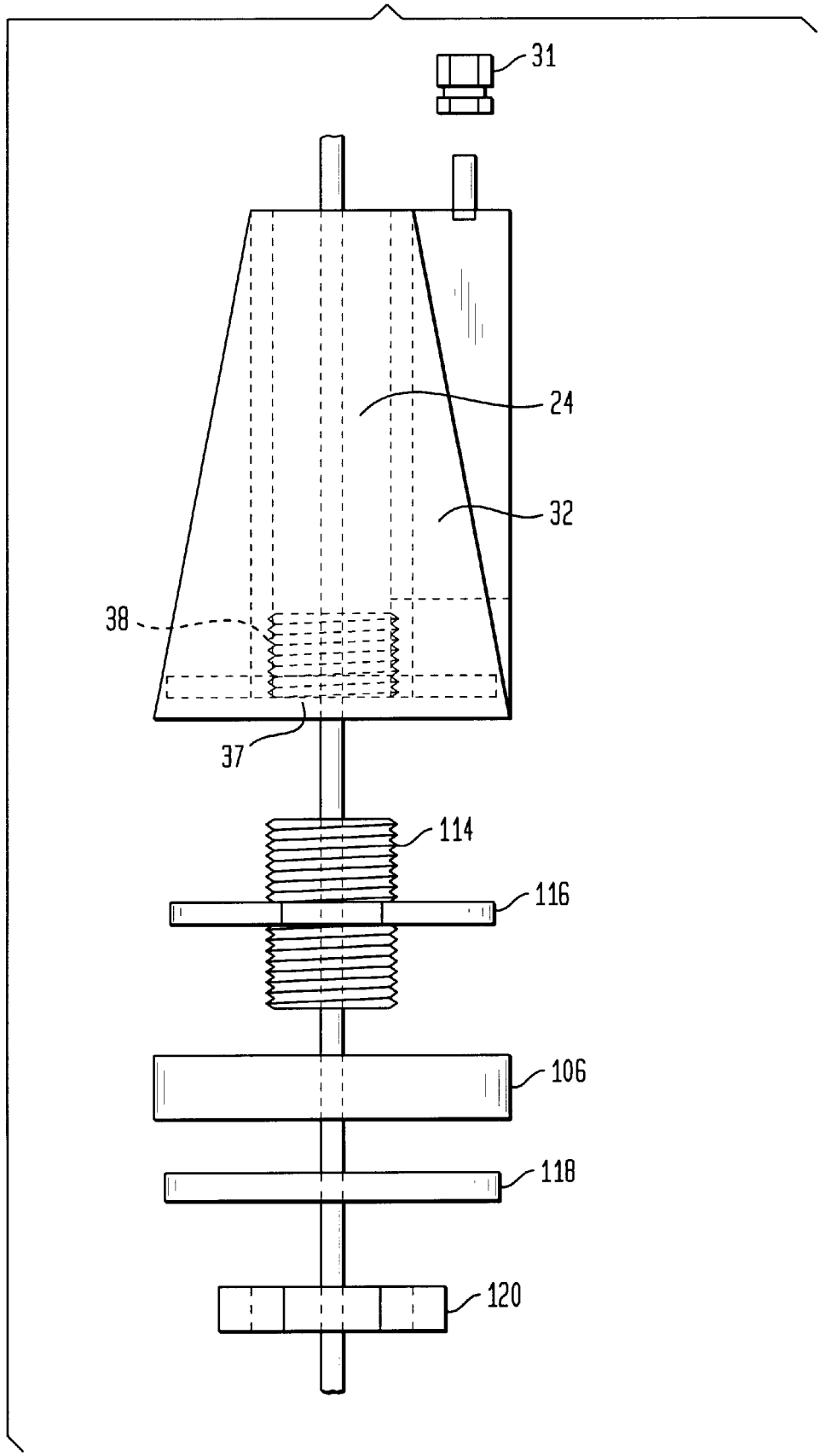
FIG. 8 illustrates a front view of one embodiment of the arm mount.

FIG. 8 illustrates an alternative embodiment for connecting the extension arm 10 to the mounting surface 106. This embodiment includes connecting the arm mount 20 to the mounting surface 106 so as to enable the cables 102 to travel through the mounting surface 106 and into the arm mount 20 so as to be completely hidden from view above the upper surface of the mounting surface 106. In this embodiment, the hole 26 would not be required. The first plate 22 would have a hole 37 formed therethrough that was in alignment with the first tube 24. The first tube 24 would then include an internally threaded portion 38. The mounting device 108 could include a sixth tube 114, that is externally threaded, connected to a fourth plate 116 so that the sixth tube 114 extends from both ends of the fourth plate 116. One end of the sixth tube 114 would be connected to the arm mount 20 by threading the sixth tube 114 into the second tube 24. The other end of the sixth tube 114 would then be placed within a hole that was formed in the mounting surface 106. A fifth plate 118 could then be placed over the other end of the sixth tube 114 and against the lower surface of the mounting surface 106. The combination could be held together by a connector 120, such as a steel washer, being threaded on the sixth tube 114 until it firmly causes the fifth plate 118 to press against the lower surface of the mounting surface 106. It should be noted that in this embodiment the screws 36 may or may not be used to help secure the extension arm 10 to the mounting surface 106.

Figure 9:
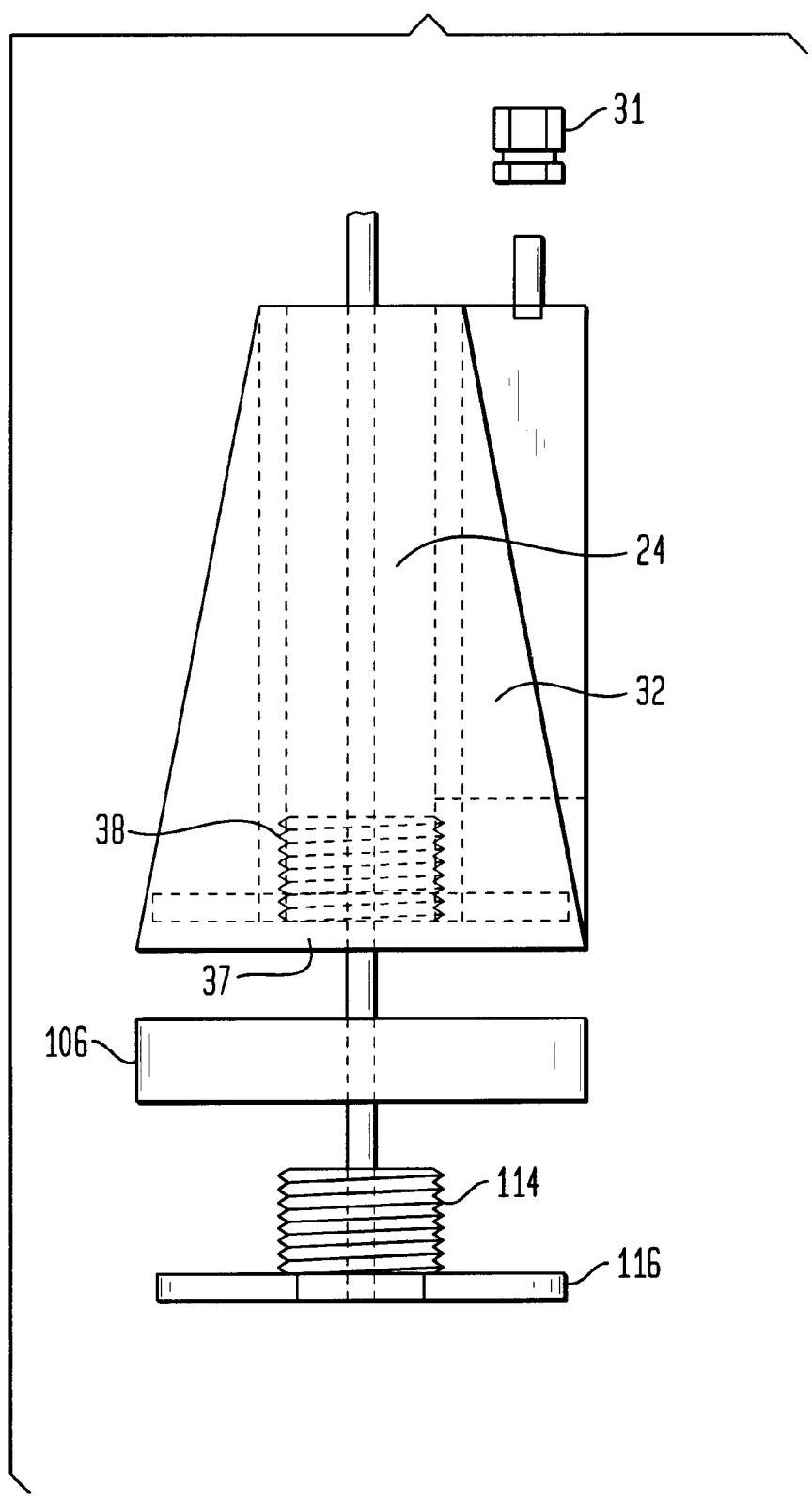
FIG. 9 illustrates a front view of one embodiment of the arm mount.

As illustrated in FIG. 8, the fourth and fifth plates 116, 118 are the same size as the first plate 22. It would be obvious to one skilled in the art, that this is the preferred size of the plates so as to provide the most support for the extension arm 10. However, it is within the scope of the current invention to have fourth and fifth plates 116, 118 that are either larger or smaller than the first plate 22. It would also be obvious to one skilled in the art that various other configurations could be used that would connect the extension arm 10 and the mounting surface 106 together in such a fashion as to allow cables 102 to travel through the mounting surface 106 and into the extension arm 10 that are within the scope of the current invention. For example, as illustrated in FIG. 9, the sixth tube 114 could protrude only from an upper surface of the fourth plate 116. The fourth plate 116 could then be placed on the lower surface of the mounting surface 106, with the sixth tube 114 protruding though the mounting surface 106 and into the first tube 24.

It would be obvious to one skilled in the art that the extension arm 10 could be designed for connecting to either mounting device 108 disclosed above, or to both of the mounting devices 108. That is, the arm mount 20 could be configured to have only the hole 26, only the hole 37, or both holes 26, 37. If both holes 26, 37 were provided a cover (not shown) could be produced that would cover the hole 26 when it was not being used (i.e., the cables 102 are fed from beneath a mounting surface 106, through the mounting surface 106 and into the extension arm 10). When the hole 37 is not being used (i.e., the cables 102 enter the extension arm 10 through the hole 26), the fourth and fifth plates 116, 118, the sixth tube 114 and the connector 120 are not required. The arm mount 20 can be placed so that the hole 37 is sealed by the mounting surface 106 or a portion of a mounting device 108, such as the upper bracket 110.

Referring back to FIG. 1, the main arm 40 includes a second tube 42, a second plate 44, and a third tube 46, each constructed of a rigid material, such as steel. The second plate 44 has a hole formed in each of two opposite ends. The second tube 42 is connected to the second plate 44 by, for example, welding, so that an inner diameter of the second tube 42 is aligned with one of the holes in the second plate 44 and the second tube 42 is perpendicular to the second plate 44. The third tube 46 is connected to the second plate 44 by, for example welding, so that an inner diameter of the third tube 46 is aligned with the other hole in the second plate 44 and the third tube 46 is perpendicular to the second plate 44. The embodiment illustrated in FIG. 1 has both the second tube 42 and the third tube 46 connected to the second plate 44 so as to extend vertically downward. It should be obvious to one skilled in the art that the third tube 46 may extend vertically upward, that is in the opposite direction of the second tube 42.

Figure 10:
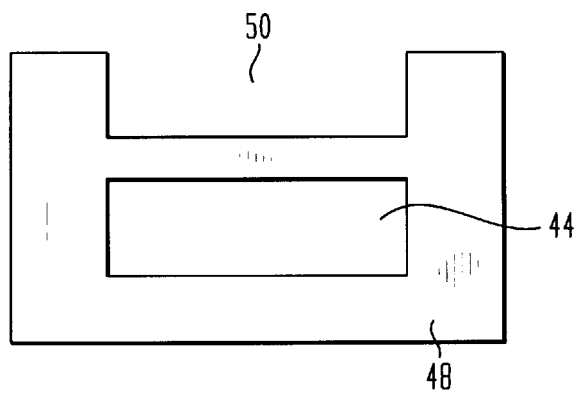
FIG. 10 illustrates a side view of the main arm of FIG. 1.

To give the main arm 40 a finished look, the main arm 40 should be coated with a finishing material 48, such as plastic, zinc or aluminum, with plastic being a preferred material. The finishing material 48 may be applied in numerous ways, with the preferred method being to cast mold the finishing material 48 on the main arm 40. Cast molding the finishing material 48 allows the finishing material 48 to take on a predefined shape. The finishing material 48 should at a minimum cover the connections between the second plate 44 and the second and third tubes 42, 46. To provide a completely finished look the finishing material 48 should cover the entire outer surface of the main arm 40 with at least a thin coating. Preferably, the finishing material 48 will completely encompass the second plate 44 and create a first channel 50 above the first plate 44, as illustrated in FIG. 10. The first channel 50 is used to guide cables 102 along the main arm 40 so that they can be enclosed therewithin.

As such, a preferred embodiment of the main arm 40 includes a first channel cover 52. The first channel cover 52 can be inserted over the first channel 50 so as to hide the cables 102 from view and be easily removable so as to provide easy access to the cables 102 so that the cables 102 can be removed, replaced or added. As would be obvious to one skilled in the art, the first channel 50 and the first channel cover 52 could be designed in numerous ways to provide a removable connection between the two.

Figure 11A:
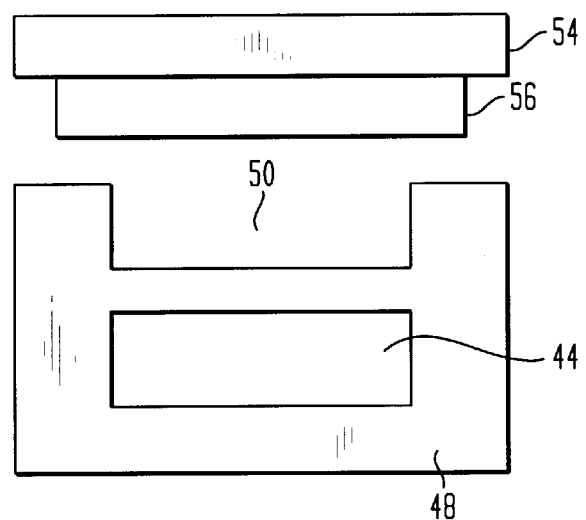
FIGS. 11(a) and 11(b) illustrate side views of one embodiment of the main arm of FIG. 1.
Figure 11B:
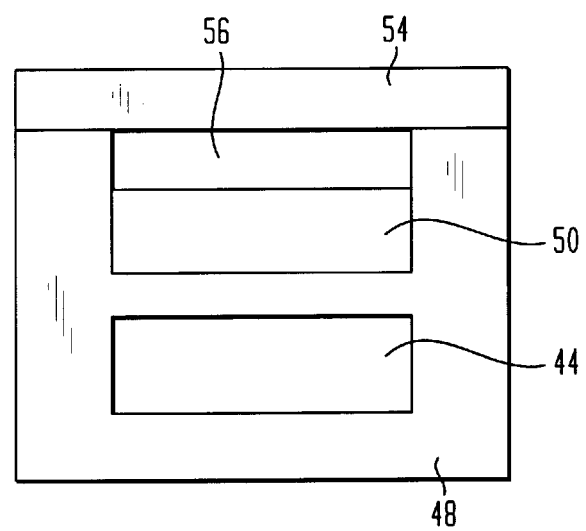

For example, as illustrated in FIG. 1, the first cable cover 52 may include a roof 54 and several caps of compressible material 56 extending therefrom. As illustrated in FIG. 11(a), the width of the compressible material 56 could be greater than the width of the opening in the first channel 50. When the first channel cover 52 is inserted into the first channel 50, the compressible material 56 condenses to fit within the first channel 50. As illustrated in FIG. 11(b), once in the first channel 50, the compressible material 56 applies a slight force against the side of the first channel 50 as it attempts to return to its natural state. Thus, a snug fit between the first channel 50 and the first channel cover 52 is created. However, the snug fit does not prevent the first channel cover 52 from being removed when a slight pressure is applied in a direction opposite from the first channel 50.

Figure 12A:
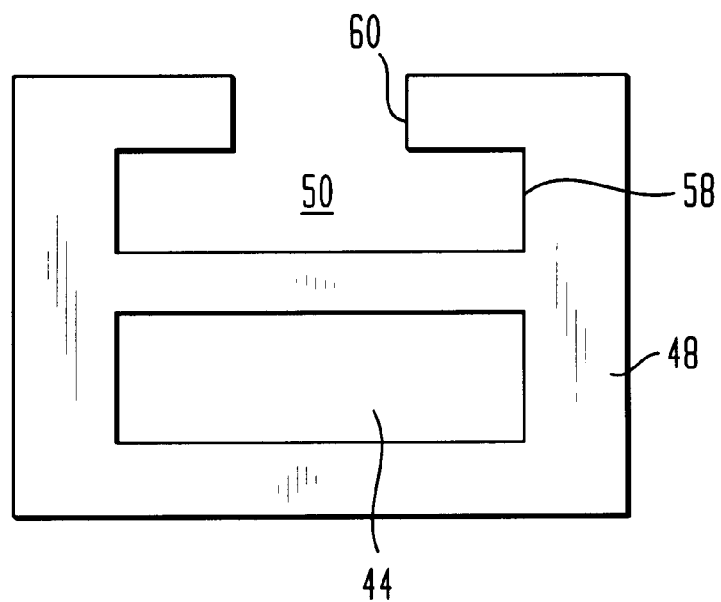
FIGS. 12(a) and 12(b) illustrate side views of one embodiment of the main arm of FIG. 1.
Figure 12B:
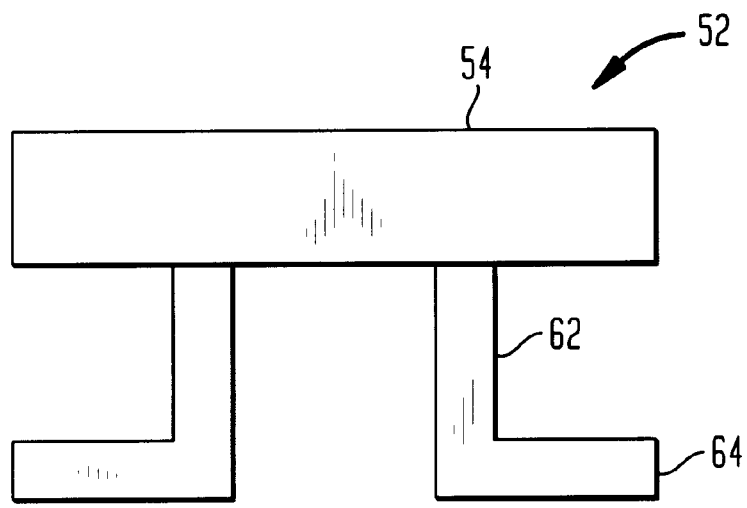

Alternatively, as illustrated in FIG. 12(a), sidewalls 58 of the first channel 50 may have a lip 60 formed on the upper surface thereof. As illustrated in FIG. 12(b), the first channel cover 52 may have sidewalls 62 extending from the roof 54, the sidewalls 62 having lip 64 extending outward from an outer edge. Thus, when the first channel cover 52 is inserted into the first channel 50, the lip 64 engages with the lip 60 to create a snug fit. However, the first channel cover 52 is easily removed from the first channel 50 when the appropriate pressure is applied. As one skilled in the art would recognize, there is numerous embodiments that could be used to connect the first channel cover 52 and the first channel 50 that are within the scope of this invention.

As illustrated in FIG. 1, the second tube 42 has a diameter that is smaller than the diameter of the first tube 24 so as to fit therewithin. That is, the first tube 24 is the female end and the second tube 42 is the male end for this connection. Within the first tube 24 is a bushing 39 made of a smooth material, such as plastic, located at an upper end of the first tube 24. The bushing 39 provides a smooth surface between the first tube 24 and the second tube 42 to reduce or eliminate friction. Thus, it follows that the diameter of the second tube 42 will also be slightly smaller than the diameter of the bushing 39 so that it can fit inside of the bushing 39. It would be obvious to one skilled in the art, that if the finishing material 48 on the second tube 42 was smooth and thick enough it would be possible to use the finishing material 48 to reduce or eliminate friction between the first and second tubes 24, 42, therefore eliminating the need for the bushing 39.

To control the extent to which the second tube 42 of the main arm 40 slides within the first tube 24 of the arm mount 20, a height control device 66, such as a collar, is provided. The height control device 66 slides over the second tube 42 and is locked in position on the second tube 42 by tightening, for example, a set screw 68. The height control device 66 has an outer diameter that is wider than an inner diameter of the first tube 24 so that it rests upon the first tube 24. Thus, the height control device 66 prevents the second tube 42 from sliding any further into the first tube 24.

Figure 13A:
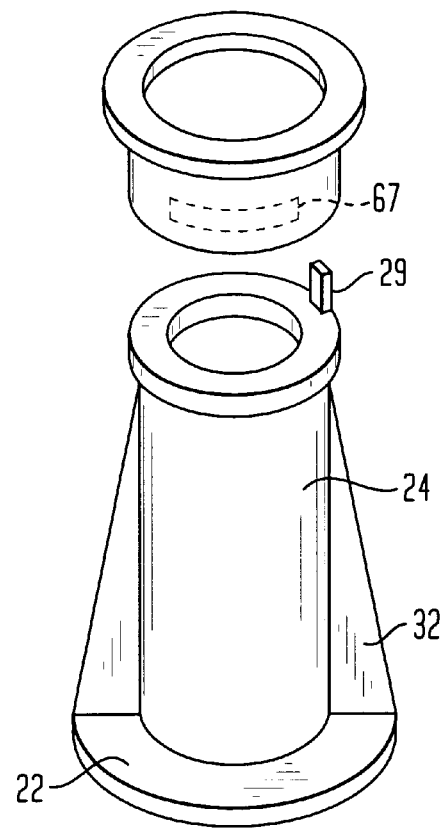
FIGS. 13(a) and 13(b) illustrate one embodiment of the main arm and arm mount connection.
Figure 13B:
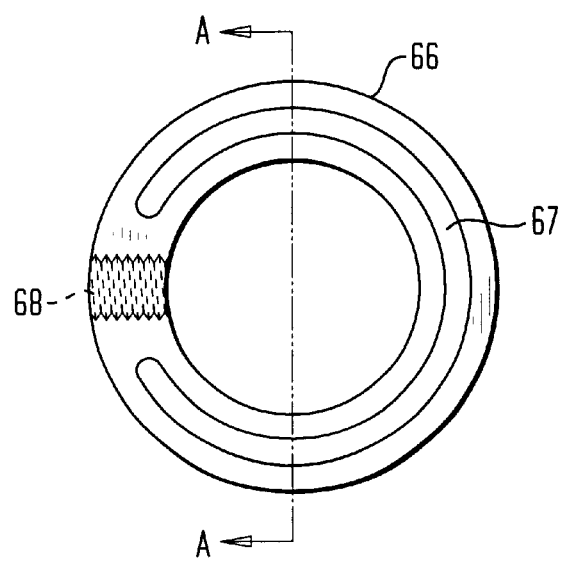

If the second tube 42 was continually rotated around the first tube 24, the cables 102 within the extension arm 10 would become tangled. Thus, there is a need for a stop 31 that will prevent the second tube 42 from rotating more than 360 degrees. As illustrated in FIG. 1, the stop 31 may be embedded in the cone 32 and protrude upwards therefrom. Thus, when the second tube 42 is rotated the height control device 66, which protrudes therefrom, will contact the stop 31 at a certain point on the axis of rotation and prevent the height control device 66 and the second tube 42 from rotating any farther in that direction. As one skilled in the art would recognize, the stop 31 could have various other configurations, including being an integral part of the height control device 66, the first plate 22, the first tube 24, or some combination thereof, without departing from the scope of the current invention. For example, as illustrated in FIGS. 13(a) and 13(b), the first tube 22 could include a tab 29 extending therefrom. The height control device 66 could include a ring 67 formed therein that extends less than 360 degrees around the height control device 66. The tab 29 would fit within the ring 67 and would allow the height control device 66, and the second tube 42 to which it is connected, to rotate around the first tube 24 until the tab 29 contacts a portion off the height control device 66 that does not contain the ring 67.

Another embodiment of the extension arm 10 would include a means for preventing the second tube 42 from being completely removed from the first tube 24. This prevention is advantageous because if the second tube 42 is completely removed from the first tube 24, the main arm 40 and the forearm extension 80 would likely topple over as the arm mount 20 will not be providing the necessary support. One embodiment that would provide this type of prevention is to have a lower portion of the second tube 42 flange out and an upper portion of the first tube 24 flange in. Thus, the two flanged portions would contact each other and not allow the second tube 42 to be removed from the first tube 24. One disadvantage to this embodiment is that the first and second tubes 24, 42 would have to be manufactured connected together, that is with the second tube 42 already within the first tube 24. Other embodiments would include a mechanism where the first and second tubes 24, 42 can be locked together, or where the height control device is movably attached to the second tube 42 and the height control device can then lock in place with the first tube 24. It should be obvious to those skilled in the art that there are numerous mechanisms available that would prevent the second tube 42 from being completely removed from the first tube 24 that are well within the scope of this invention.

It would be obvious to one skilled in the art that the second tube 42 could have a larger diameter than the first tube 24 so that the first tube 24 was the male end and the second tube 42 was the female end of the connection. In this embodiment, the finishing material 28 on the arm mount 20 could not form the fins 30 or the cone 32. Moreover, in this embodiment the height control device 66 would be located on the first tube 24 and have a diameter greater than the second tube 42 to prevent the second tube 42 from sliding any farther over the first tube 24. Additionally, the bushing 39 would be contained within the second tube 42 instead of within the first tube 24 to reduce friction between the two. Furthermore, if the finishing material 28 on the first tube 24 was smooth and thick enough it could reduce friction and eliminate the need for the bushing 39.

Figure 14:
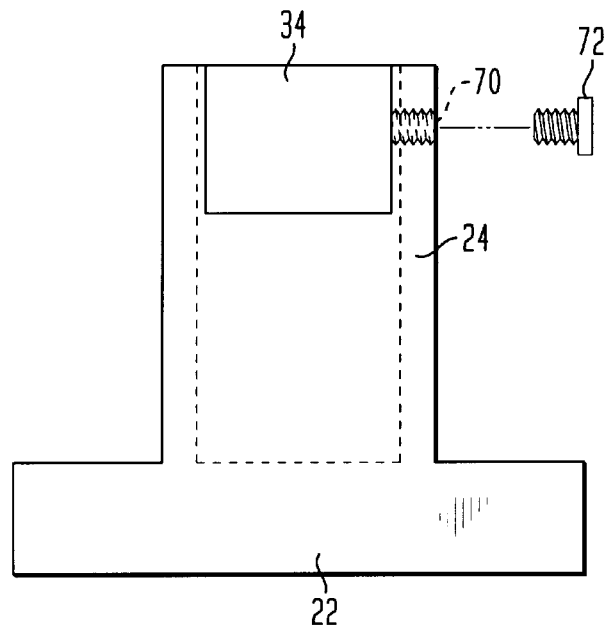
FIG. 14 illustrates a front view of one embodiment of the arm mount of FIG 1.

One embodiment of the extension arm 10 would include a means for preventing the rotation of the second tube 42 around the first tube 24. For example, as illustrated in FIG. 14, the first tube 24 could have a threaded hole 70 formed therein that aligns with the bushing 39. The threaded hole 70 would have, for example, a set screw 72 contained therein that could be tightened so as to deform the bushing 39 and prevent the second tube 42 from rotating. It would be obvious to one skilled in the art that there are numerous means for preventing the second tube 42 from rotating around the first tube 24 that are well within the scope of the current invention.

Figure 15:
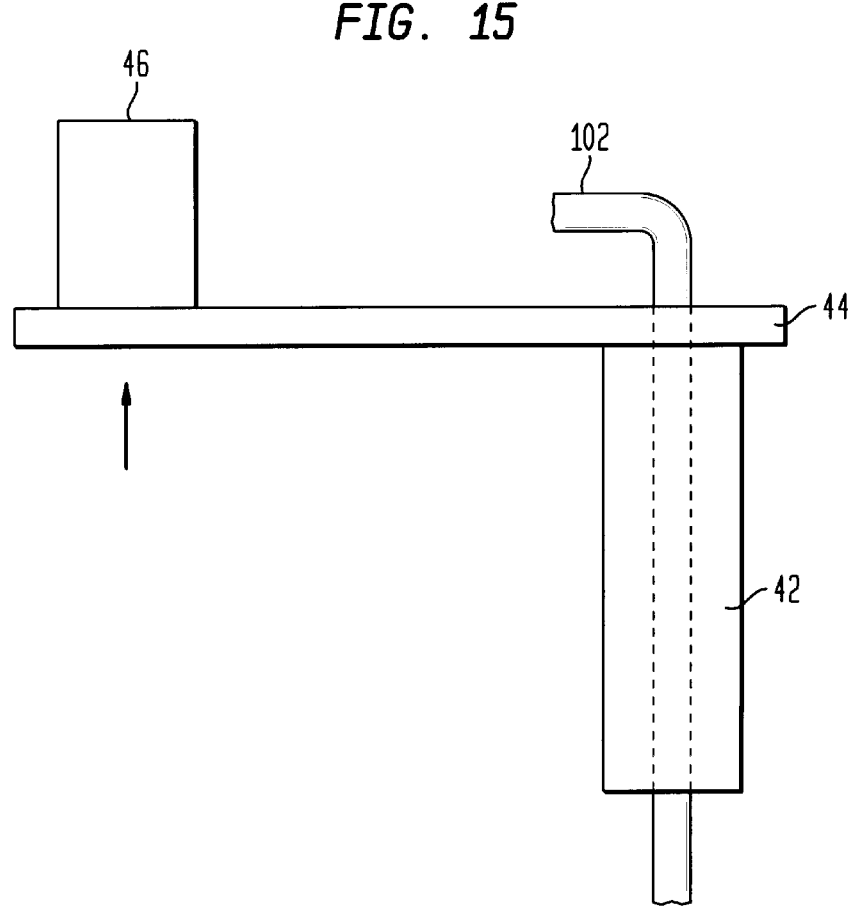
FIG 15. illustrates a front view of one embodiment of the main arm.

As discussed above, and as illustrated in FIG. 15, the second tube 42 and the third tube 46 could extend perpendicular to the second plate 44 in opposite directions of each other. As is clearly illustrated the cables 102 would exit the second tube 42 on an upper surface of the second plate 44, while the opening of the third tube 46 would be on a lower surface thereof. Thus, in order to keep the cables 102 hidden from view it would be necessary to modify the main arm 40.

Figure 16:
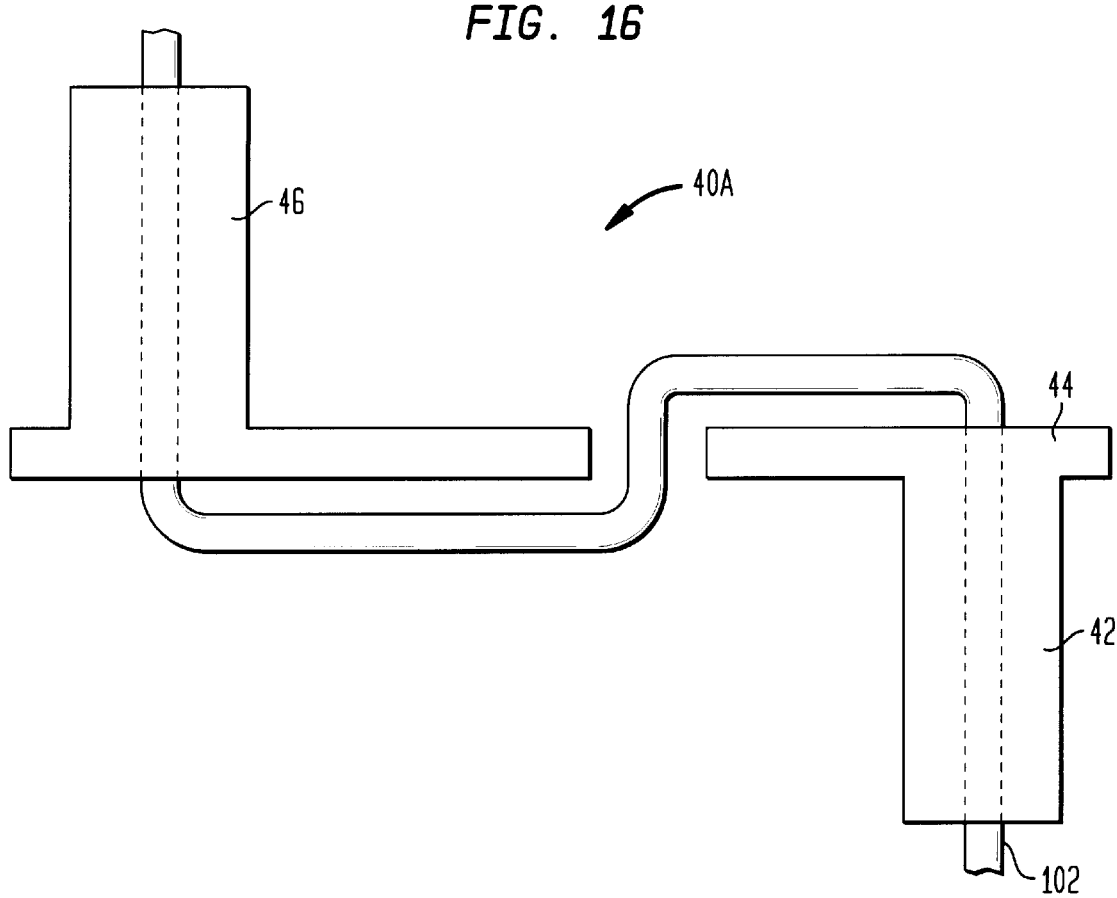
FIG. 16 is illustrates a front view of one embodiment of the main arm.

One embodiment of a modified main arm 40A is illustrated in FIG. 16. This embodiment includes an additional hole somewhere in the middle of the second plate 44. The cables 102 would then travel above the second plate 44 for a certain distance, drop down through the hole and travel along the lower surface of the second plate 44 and then proceed through the third tube hole in the second plate 44 and through the third tube 46. As would be obvious to one skilled in the art, the finishing material 48 would have to be applied differently so that a channel exists both above and below the second plate 44 and that the finishing material 48 does not cover the additional hole. As would also be obvious an additional channel cover would be required.

Figure 17:
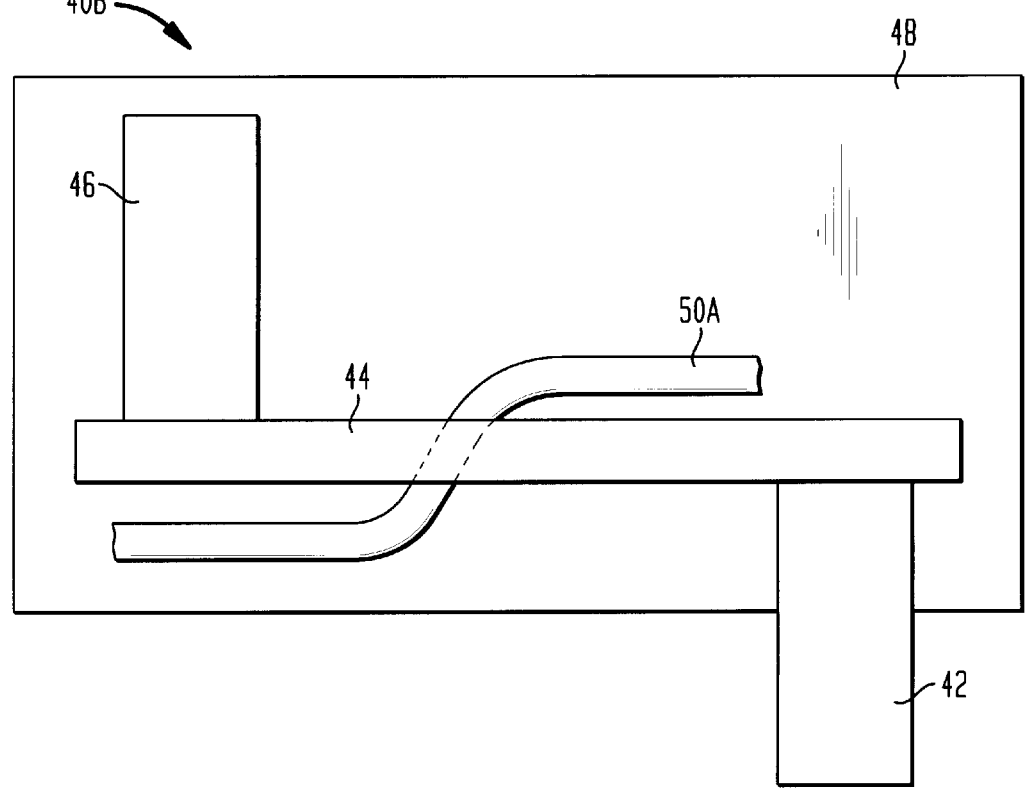
FIG. 17 illustrates a front view of one embodiment of the main arm.

Another embodiment of a modified main arm 40B is illustrated in FIG. 17. In this embodiment the finishing material 48 is applied so as to create a first channel 50A that starts on an upper surface and rotates around the outer perimeter of the second plate 44 to a lower surface thereof. In this embodiment, no additional holes are required in the second plate 44. A first channel cover (not illustrated) would have to be provided that was formed to the spiral shape of the first channel 50A or would have to be made of a material that could be deformed into the spiral shape. It would be obvious to those skilled in the art that numerous other embodiments are within the scope of this invention that would enable the second tube 42 and third tube 46 to extend from the second plate 44 in opposite directions.

The forearm extension 80 includes a third plate 82 a fourth tube 84, and a fifth tube 86. The third plate 82 and the fourth and fifth tubes 84, 86 are constructed of a rigid material, such as steel. The third plate 82 has a hole formed in each end thereof, the diameter of the holes being equal to the diameter of the fourth and fifth tubes 84, 86 respectively. The fourth and fifth tubes 84, 86 are aligned with the respective holes so as to be perpendicular to the third plate 82, and are connected to the third plate 82 by, for example, welding.

The forearm extension 80 is then coated with a finishing material 88, such as plastic, zinc or aluminum, with plastic being a preferred material, to give it a finished look. The finishing material 88 may be applied in numerous ways, with the preferred method being to cast mold the finishing material 88 on the forearm extension 80. The material 88 should form a second channel 90 around the third plate 82. The second channel 90 allows cables 102 to travel therewithin. The second channel 90 would be configured so as to accept a second channel cover 92, that could be attached thereto so as to hide the cables 102 from view, yet still provide easy access thereto. As illustrated in FIG. 1, cables 102 would travel through the center of the fourth tube 84 and would come out on the lower side of the third plate 82. Thus, the second channel 90 would be formed on a lower surface of the third plate 82. As the forearm extension 80 is designed to accept a device mount 100, such as a tilter, it is preferable that the second channel cover 92 have a hole formed therein so that the cables 102 can protrude therethrough and connect to the electronic device that is connected to the device mount 100.

It would be obvious to those skilled in the art that if the device mount 100 was designed in such a fashion so as to allow cables to be fed therethrough that the forearm extension 80 could be modified so as to allow the cables 102 to travel through the fifth tube 86 and into the device mount 100.

As illustrated in FIG. 1, the fourth tube 84 extends vertically upward and has a diameter that is smaller than the diameter of the third tube 46, which is extending vertically downward. Thus, the fourth tube 84 is inserted up into the third tube 46. That is, the fourth tube 84 is the female end and the third tube 46 is the male end for this connection. Within the third tube 46 is a bushing 74 made of a smooth material, such as plastic, located at a lower end thereof. The bushing 74 provides a smooth surface between the third tube 46 and the fourth tube 84 to reduce or eliminate friction. Thus, it follows that the diameter of the fourth tube 84 will also be slightly smaller than the diameter of the bushing 74 so that it can fit inside of the bushing 74. It would be obvious to one skilled in the art, that if the finishing material 88 on the fourth tube 84 was smooth and thick enough it would be possible to use the finishing material 88 to reduce or eliminate friction between the third and fourth tubes 46, 84, therefore eliminating the need for the bushing 74.

Figure 18:
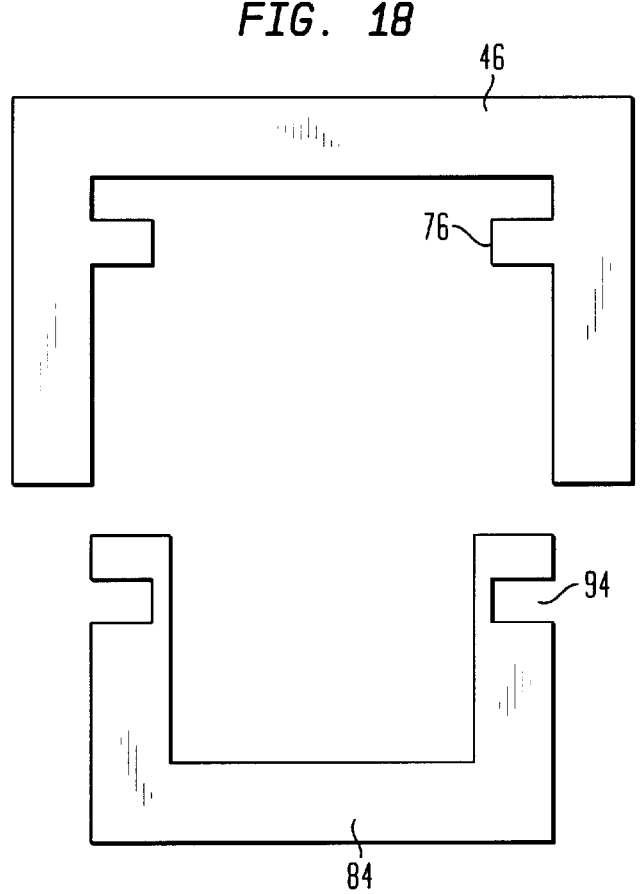
FIG. 18 illustrates a front view of one embodiment of the connection between the third tube and the fourth tube.

A means for engaging the third tube 46 and the fourth tube 84 while allowing the fourth tube 84 to rotate around the third tube 46 is required. As illustrated in FIG. 18, one embodiment that provides this function is to have a groove 94 formed in an outer surface of the fourth tube 84 and a lip 76 formed on an inner surface of the third tube 46. When the fourth tube 84 is inserted into the third tube 46, the lip 76 engages with the groove 94. As one skilled in the art would understand, there are numerous embodiments that would provide a removable connection between the third and fourth tubes 46, 84 that would also allow the tubes to rotate around one another that would be within the scope of this invention.

It would obvious to one skilled in the art that the fourth tube 84 could have a larger diameter than the third tube 46 so that the third tube 46 was the male end and the fourth tube 84 was the female end of the connection. In this embodiment, the lip 76 would be formed on an inner surface or the fourth tube 84 and the groove 94 would be formed on an outer surface of the third tube 46. Additionally, the bushing 74 would be contained within the fourth tube 84 instead of within the third tube 46 to reduce friction between the two. Furthermore, if the finishing material 48 on the third tube 46 was smooth and thick enough it could reduce friction and eliminate the need for the bushing 74.

One embodiment of the extension arm 10 would include a means for preventing the rotation of the fourth tube 84 around the third tube 46. As discussed above, the third tube 46 could have, for example, a threaded hole formed therein that aligns with the bushing 74. The threaded hole could have, for example, a set screw contained therein that could be tightened so as to deform the bushing 74 and prevent the fourth tube 84 from rotating. It would be obvious to one skilled in the art that there are numerous means for preventing the fourth tube 84 from rotating around the third tube 46 that are well within the scope of the current invention.

FIG. 1 illustrates an embodiment in which the fourth tube 84 extends vertically upward from the third plate 82 and the fifth tube 86 extends vertically downward from the third plate 82. That is, the fourth and the fifth tubes 84, 86 extend in opposite directions. It would be obvious to one skilled in the art that the fourth and fifth tubes 84, 86 could extend in the same direction as each other. Similar modifications would be required to the forearm extension 80, much like those described above and illustrated in FIGS. 16 and 17 for the main arm 40.

If the fourth tube 84 was continually rotated around the third tube 46, the cables 102 within the extension arm 10 would become tangled (Note: this would only be a problem if the device mounted thereto was above the arm mount 20 so as not to contact it). Thus, there is a need for a continuous rotation prevention device (not shown) to prevent the fourth tube 84 from rotating more than 360 degrees. As one skilled in the art would know, there are numerous devices that could perform this function that are well within the scope of the current invention. For example, the continuous rotation prevention device could comprise of a bump (not shown) on a portion of the lip 76 and a bump (not shown) on a portion of the groove 94. If the two bumps come in contact with each other, the further rotation of the fourth tube 84 in that direction is prevented.

One preferred embodiment of the extension arm 10 includes a bushing 96 within the fifth tube 86 so as to reduce or eliminate friction between the fifth tube 86 and a device mount 100, such as a tilter, that would be rotatably connected thereto. To enable the device mount 100 to be locked in place, i.e. not rotate around the extension arm 80, the fifth tube 86 may comprise a means for preventing rotation therearound. For example, as discussed above, a threaded hole could be formed within the fifth tube 86 in alignment with the bushing 96. A threaded screw could be provided therein that when tightened would deform the bushing 96 and prevent the device mount 100 from rotating.

Figure 19:
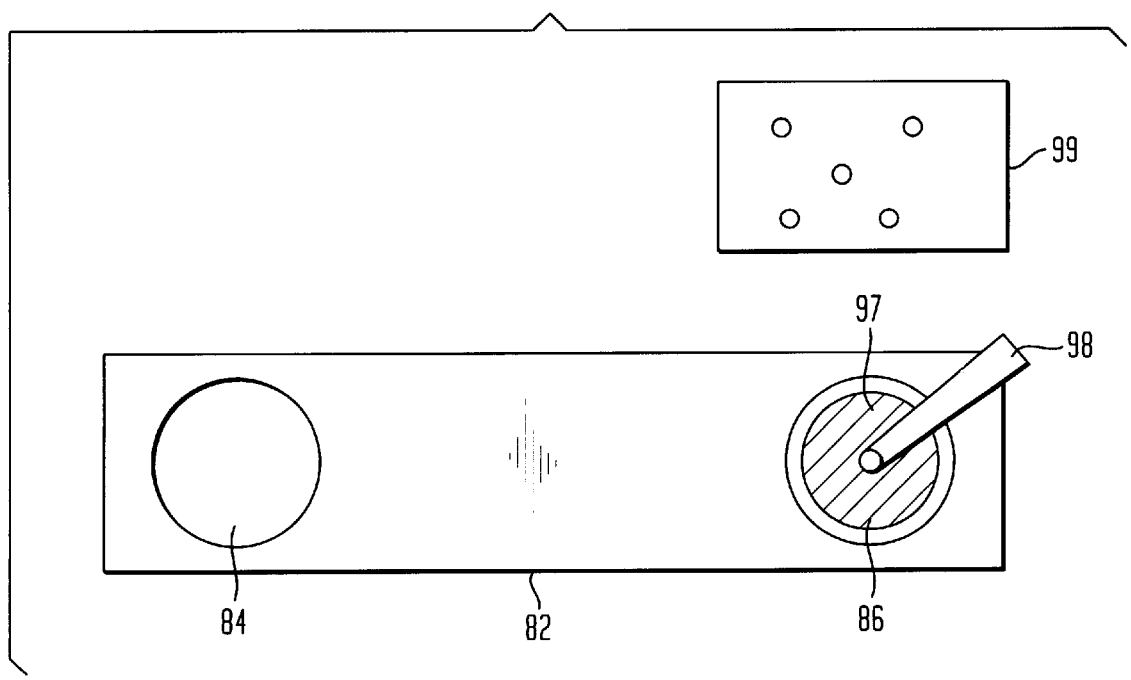
FIG. 19 illustrates a top view of one embodiment of the extension arm.

Another embodiment of the extension arm 10, as illustrated in FIG. 19, includes the forearm extension 80 having a ball joint 97 within the fifth tube 86. The ball joint 97 would have a shaft 98 connected thereto. The shaft 98 could be connected to a connection arrangement 99 that could in turn be connected to a device. For example, one connection arrangement 99 could be an adapter plate (i.e., a plate having holes formed therein that align with the holes in standard electronic devices). Another example of the connection arrangement 99, would be a housing designed to house a particular device, or an adjustable housing. The combination of the ball joint 97, the shaft 98, and the connection arrangement 99 would allow an electronic device to be mounted directly to the extension arm 10 without the need for a device mount 100, such as a tilter. The ball joint 97 would provide a user with a limited ability to rotate the electronic device connected thereto around several axis. That is, the combination 97–99 would form a built in tilter. As one skilled in the art would recognize the built in tilter could have numerous configurations that are well within the scope of the current invention.

It should be noted that in order for the cables 102 not to become entangled as the tubes are rotated with respect to one another, it is preferable that the cables 102 travel through the center point of rotation of each device. This will prevent the cables 102 from becoming entangled with one another.

It should also be noted that the diameter of the tubes can vary greatly depending on the type of cables 102 being fed therethrough. However, in order to provide a standard extension arm 10 it would be preferable if the smaller tubes, i.e., the male tubes, had an inner diameter of at least 1.5 inches so that a standard mini-din connector could fit therethrough. The thickness of all the tubes preferably would be at least $\frac{1}{16}^{th}$ of an inch to provide the necessary strength. The diameter of the bigger tubes, i.e., the female tubes, would have an inner diameter that was larger than the outer diameter of the male tubes by the thickness of the bushings.

Any of the embodiments of the extension arm 10 described above are easy to assemble and use. As described above, the extension arm 10 includes three major components, the arm mount 20, the main arm 40 and the forearm extension 80. The arm mount 20 is mounted to the mounting surface 106 via the mounting device 108. The mounting device 108 may be either a threaded tube 114 and a combination of plates 116–120 when the mounting surface 106 is provided with a hole, or a combination of brackets 110, 112 and a connection means. In either case, the arm mount 20 is secured to the mounting surface 106 by tightening a plate/bracket.

After the arm mount 20 is securely connected to the mounting surface 106 the main arm 40 is connected to the arm mount 20 by sliding the second tube 42 within the first tube 24. The second tube 42 is held at a desired height by setting the location of the height control device 66.

After the main arm 40 and the arm mount 20 are connected, the forearm extension 80 is connected to the main arm 40 by sliding the fourth tube 84 within the third tube 46 until the two lock together (for example; the lip 76 engages the groove 94).

If the embodiment includes a device mount 100, such as a tilter, a shaft of the tilter is placed within the fifth tube 86. If the embodiment includes the built-in-tilter 97–99, the appropriate connection arrangement 99 needs to be connected to the shaft 98.

After the device is connected to the device mount 100 or built-in-tilter 97–99, and the power and/or data supply are put in position (ie; below the mounting surface 106) the cables 102 can travel through the extension arm 10 to connect the device to the source while being hidden from view.

In order to connect the cables 102, the first channel cover 52 and the second channel cover 92 are removed. The device end of the cable 102 is inserted into the third tube 46 and fed through the third tube 46 into the fourth tube 84 and out of the fourth tube 84. The cable 102 is then fed through the second channel 90 and is connected to the device. The second channel cover 92 is then installed.

The source end of the cable 102 is inserted into the second tube 42 and fed through the second tube 42 into the first tube 24. The cable 102 exits the first tube 24 at the end of the first tube 24 and continues through the first plate 22 and the mounting surface 106, if the embodiment utilizes the hole in the mounting surface 106 as part of the mounting device 108. If the embodiment utilizes a mounting device 108 that includes, for example brackets and clamps, the cable 102 will exit the hole 26 in the side of the first tube 24. In either event, the cable 102 is connected to the source.

Any cable slack within the first channel 50 is fed through the path to the device or the path to the source so that the cable 102 lays flat. The first channel cover 52 is then inserted into the first channel 50. As one skilled in the art would know, this process can be modified in various ways without departing from the scope of the current invention.

Although this invention has been illustrated by reference to specific embodiments, it will be apparent to those skilled in the art that various changes and modifications may be made, which clearly fall within the scope of the invention. The invention is intended to be protected broadly within the spirit and scope of the appended claims.

What is claimed:

1. An extension arm for adjustably mounting a device to a mounting surface and hiding cables to and from the device within said extension arm, said extension arm comprising:
    an arm mount for supporting said extension arm on the mounting surface, said arm mount including a first plate connected to a first tube;
    a main arm including a second tube, a third tube and a second plate, said second plate having a first hole disposed on a first end and a second hole disposed on a second end, said second tube connected to said second plate so as to align with said first hole and said third tube connected to said second plate so as to align with said second hole; and
    a forearm extension including a fourth tube, a fifth tube and a third plate, said third plate having a third hole disposed on a first end and a fourth hole disposed on a second end, said fourth tube connected to said third plate so as to align with said third hole and said fifth tube connected to said third plate so as to align with said fourth hole;
    wherein said main arm is rotatably and slidably connected to said arm mount via said first tube and said second tube and said forearm extension is rotatably connected to said main arm via said third tube and said fourth tube.

2. The extension arm of claim 1, wherein said first tube, said second tube, said third tube, said fourth tube, said fifth tube, said first plate, said second plate and said third plate are made of a rigid material.

3. The extension arm of claim 2, wherein the rigid material comprises steel.

4. The extension arm of claim 1, wherein said arm mount, said main arm, and said forearm extension are coated with a finishing material.

5. The extension arm of claim 4, wherein said finishing material is plastic.

6. The extension arm of claim 4, wherein said finishing material is cast molded.

7. The extension arm of claim 6, wherein said finishing material is cast mold so as to form a first channel on one surface of said second plate and a second channel on one surface of said third plate.

8. The extension arm of claim 7, wherein said first channel and said second channel are large enough to allow data and power cables to travel therethrough.

9. The extension arm of claim 7, further comprising a first channel cover that is removably connectable to said first channel and a second channel cover that is removably connectable to said second channel.

10. The extension arm of claim 1, wherein each of said first tube, said second tube, said third tube, said fourth tube, and said fifth tube, have an inner diameter that is large enough to allow data and power cables to travel therethrough.

11. The extension arm of claim 1, wherein said first tube has a fifth hole in a side thereof adjacent to an end of said first tube that is connected to said first plate, said fifth hole being large enough to allow data and power cables to travel therethrough.

12. The extension arm of claim 1, wherein said first plate has a fifth hole formed therein that is in alignment with said first tube so that cables can travel therethrough.

13. The extension arm of claim 1, wherein a diameter of said second tube is smaller than a diameter of said first tube so that said second tube will fit inside of said first tube.

14. The extension arm of claim 13, wherein said first tube has a bushing therewithin so as to prevent friction between said first tube and said second tube, when said second tube is placed within said first tube.

15. The extension arm of claim 13, further comprising means for maintaining said second tube at a desired height within said first tube.

16. The extension arm of claim 15, wherein said means for maintaining is a collar that is slidably attachable to said second tube and has an outer diameter that is greater than an inner diameter of said first tube so when it contacts said first tube it is held in place and thus holds said second tube at a desired height.

17. The extension arm of claim 16, wherein said collar includes an engagement device to hold said collar at a desired height on said second tube.

18. The extension arm of claim 1, wherein a diameter of said fourth tube is smaller than a diameter of said third tube so that said fourth tube will fit inside of said third tube.

19. The extension arm of claim 18, wherein said third tube has a bushing therewithin so as to prevent friction between said third tube and said fourth tube, when said fourth tube is placed within said third tube.

20. The extension arm of claim 18, further comprising means for securing said third tube and said fourth tube together.

21. The extension arm of claim 20, wherein said means for securing includes an interior surface of said third tube having a lip formed protruding therefrom and an exterior surface of said fourth tube having a groove formed therein, so that when said lip engages said groove it locks said third and said fourth tubes together.

22. The extension arm of claim 1, wherein said first tube is connected to said first plate, said second tube and said third tube are connected to said second plate, and said fourth tube and said fifth tube are connected to said third plate by welding.

23. The extension arm of claim 1, further comprising means for mounting the extension arm to the mounting surface.

24. The extension arm of claim 23, wherein said first plate has a fifth hole in alignment with said first tube and said first tube is internally threaded adjacent to said first plate, said means for mounting including a sixth tube connected to a fourth plate, wherein said sixth tube is externally threaded and is placed through a hole in the mounting surface and screwed into said first tube so that said fourth plate presses against a lower surface of the mounting surface, thus holding said extension arm in place.

25. The extension arm of claim 23, wherein said first plate has a fifth hole in alignment with said first tube and said first tube is internally threaded adjacent to said first plate, said means for mounting including a sixth tube, a fourth plate, a fifth plate, and a connection device, wherein said sixth tube is externally threaded, said fourth and fifth plates have holes therein, said sixth tube is connected to said fourth plate so as to protrude through both sides thereof, one end of said sixth tube is threaded into said first tube, an other end of said sixth tube protrudes through a hole in the mounting surface and said fifth plate, said fourth plate rests on an upper surface of the mounting surface and said fifth plate rests on a lower surface, said connection device is threaded on the other end of said sixth tube to secure said extension arm to said mounting surface.

26. The extension arm of claim 23, wherein said means for mounting includes a fourth plate, a fifth plate and a clamping mechanism, wherein said fourth plate is connected to said first plate and is located on an upper surface of the mounting surface, said fifth plate is located on a lower surface of the mounting surface and said clamping mechanism clamps said fourth and said fifth plates together so as to secure said extension arm to the mounting surface.

27. The extension arm of claim 26, wherein said fourth and said fifth plates are L-shaped brackets.

28. The extension arm of claim 1, further comprising a shaped cover placed over said arm mount.

29. The extension arm of claim 28, wherein said shaped cover is made of plastic.

30. The extension arm of claim 29, wherein said shaped plastic cover is sonic welded to said first plate.

31. The extension arm of claim 28, wherein said first tube has a hole formed in a side thereof and said shaped cover has a hole formed in alignment thereof so that cables can travel therethrough.

32. The extension arm of claim 31, wherein said shaped cover has a cap removably connected to said hole in said shaped cover.

33. The extension arm of claim 1, further comprising a device mount connected to said fifth tube.

34. The extension arm of claim 34, wherein said device mount is a tilter.

35. The extension arm of claim 1, further comprising:
a ball joint connected to said fifth tube so as to be within said fifth tube;
a shaft connected to said ball joint and extending from said fifth tube; and
a connection arrangement capable of holding a device connected to said shaft.

36. The extension arm of claim 36, wherein said connection arrangement is an adapter plate.

37. The extension arm of claim 36, wherein said connection arrangement is a housing.

38. A method of manufacturing an extension arm that adjustably mounts a device to a mounting surface and hides cables to and from the device within the extension arm, the method comprising:
obtaining a first plate, a second plate, a third plate, a first tube, a second tube, a third tube, a fourth tube, and a fifth tube, wherein the first tube is larger than the second tube, one of the third tube and the fourth tube is larger than an other of the third tube and the fourth tube, the second plate has a first hole formed in a first side thereof that is the same size as the second tube, and a second hole formed in a second side thereof that is the same size as the third tube, the third plate has a third hole formed in a first side thereof that is the same size as the fourth tube, and a fourth hole formed in a second side thereof that is the same size as the fifth tube;
connecting the first tube to the first plate so the first tube is perpendicular to the first plate, wherein the first tube and the first plate form an arm mount;
connecting the second tube to the second plate so as to be perpendicular to the second plate and in alignment with the first hole;
connecting the third tube to the second plate so as to be perpendicular to the second plate, in alignment with the second hole, and parallel to the second tube, wherein the second tube, the third tube and the second plate form a main arm;
connecting the fourth tube to the third plate so as to be perpendicular to the third plate and in alignment with the third hole;
connecting the fifth tube to the third plate so as to be perpendicular to the third plate, in alignment with the fourth hole, and parallel to the fourth tube, wherein the fourth tube, the fifth tube and the third plate form a forearm extension;
rotatably and slidably connecting the arm mount and the main arm by placing the second tube within the first tube; and
rotatably connecting the forearm extension and the main arm by placing one of the third tube and the fourth tube within the other of the third tube and the fourth tube.

39. The method of claim 38, wherein the first tube, the second tube, the third tube, the fourth tube, the fifth tube, the first plate, the second plate and the third plate are made of a rigid material.

40. The method of claim 39, wherein the rigid material comprises steel.

41. The method of claim 38, further comprising placing a finishing material on the arm mount, the main arm, and the forearm extension.

42. The method of claim 41, wherein the finishing material is plastic.

43. The method of claim 41, wherein said placing a finishing material includes cast molding the finishing material on the arm mount, the main arm, and the forearm extension so as to form a first channel on one surface of the second plate and a second channel on one surface of the third plate.

44. The method of claim 43, wherein the first channel and the second channel are formed large enough so that data and power cables can travel therethrough, and further comprising obtaining a first channel cover and a second channel cover, wherein the first channel cover is removably connectable to the first channel and the second channel cover is removably connectable to the second channel.

45. The method of claim 38, wherein each of the first tube, the second tube, the third tube, the fourth tube, and the fifth tube, have an inner diameter that is large enough to allow data and power cables to fit therethrough.

46. The method of claim 38, further comprising placing a bushing within the first tube so as to prevent friction between the first tube and the second tube, when the second tube is rotated or slide within the first tube.

47. The method of claim 39, further comprising connecting a height control device to the extension arm, wherein the height control device permits a varying portion of the second tube to be received within the first tube and thus vary the height of the extension arm to a desired height.

48. The method of claim 47, wherein the height control device is a collar that is slidably attachable to the second tube and has an outer diameter at least as large as an inner diameter of the first tube so that the collar and a portion of the second tube above the collar will not slide past an upper surface of the first tube.

49. The method of claim 38, further comprising placing a bushing within a larger one of the third tube and the fourth tube so as to prevent friction between the larger one of the third tube and the fourth tube and a smaller one of the third tube and the fourth tube when the smaller tube is rotated within the larger tube.

50. The method of claim 49, further comprising securing the larger tube and the smaller tube together.

51. The method of claim 50, wherein said securing the larger tube and the smaller tube together includes
forming a lip on an interior surface of the larger tube;
forming a groove on an exterior surface of the smaller tube; and sliding the smaller tube within the larger tube until the lip engages with the groove and locks the smaller and larger tubes together.

52. The method of claim 38, wherein said first tube is connected to said first tube, said second tube and said third tube are connected to said second plate, and said fourth tube and said fifth tube are connected to said third plate by welding.

53. The method of claim 38, further comprising mounting the extension arm to the mounting surface.

54. The method of claim 53, wherein the first tube is internally threaded adjacent to the first plate, the first plate has a hole formed therein, said connecting the first tube to the first plate includes connecting the first tube to the first plate in alignment with the hole in the first tube and said mounting the extension arm includes obtaining a sixth tube that is externally threaded, and a fourth plate;

connecting the sixth tube to the fourth plate so as to be perpendicular to the fourth plate;

feeding the sixth tube through a hole in the mounting surface; and screwing the sixth tube into the first tube so that the fourth plate presses against a lower surface of the mounting surface, thus holding the extension arm in place.

55. The method of claim 53, wherein the first tube is internally threaded adjacent to the first plate, the first plate has a hole formed therein, said connecting the first tube to the first plate includes connecting the first tube to the first plate in alignment with the hole in the first tube and said mounting the extension arm includes obtaining a sixth tube that is externally threaded, a fourth plate having a hole formed therein, a fifth plate having a hole formed therein, and a connection device;

connecting the sixth tube to the fourth plate so as to protrude through both sides thereof;

threading one end of the sixth tube into the first tube;

passing an other end of the sixth tube through a hole in the mounting surface, so that the fourth plate rests against an upper surface of the mounting surface;

placing the fifth plate against a lower surface of the mounting surface so that the other end of the sixth tube passes through the hole in the fifth plate; and threading the connection device on the other end of the sixth tube so as to press the fifth plate against the lower surface of the mounting surface and thus secure the extension arm to the mounting surface.

56. The method of claim 53, wherein said mounting the extension arm includes:

obtaining a fourth plate, a fifth plate and a clamping mechanism;

connecting the fourth plate to the first plate;

locating the fourth plate on an upper surface of the mounting surface;

locating the fifth plate on a lower surface of the mounting surface; and tightening the clamping mechanism so as to clamp the fourth and the fifth plates together and secure said extension arm to the mounting surface.

57. The method of claim 56, wherein said fourth and said fifth plates are L-shaped brackets.

58. The method of claim 38, further comprising:

obtaining a shaped cover; and placing the shaped cover over the arm mount.

59. The method of claim 58, wherein the shaped cover is made of plastic, the method further comprising sonic welding the plastic cover to the first plate.

60. The method of claim 38, further comprising connecting a device mount to the fifth tube.

61. The method of claim 38, further comprising:

connecting a ball joint to the fifth tube so as to be within the fifth tube;

connecting a shaft to the ball joint so as to extend from the fifth tube; and connecting a connection arrangement to the shaft, wherein the connection arrangement is capable of holding a device.

62. In a cable management extension arm system comprising:

a mounting plate mounted to a mounting surface and having a first hole formed therein in alignment with a hole in the mounting surface;

a first tube assembly having a first end and a second end, the first end connected to the mounting plate in alignment with the first hole and perpendicular to the mounting plate, the first tube assembly having a second hole formed in a side thereof adjacent to the first end;

a first channel having a first end and a second end, the first end connected to the second end of the first tube assembly so as to be perpendicular thereto, the first channel including a removable first channel cover connected thereto;

a second tube assembly having a first end and a second end, the first end connected to the second end of the first channel so as to be perpendicular to the first channel;

a second channel having a first end and a second end, the first end connected to the second end of the second tube assembly so as to be perpendicular thereto, the second channel including a removable second channel cover connected thereto; and a device mounting mechanism connected to the second end of said second channel, for mounting a device thereto;

a method for connecting the device mounted on the device mounting mechanism to a source placed beneath the mounting surface via a cable that is hidden from view within the cable management extension arm system, the method comprising:

obtaining the cable;

removing the first channel cover so as to expose the first channel, the second end of said first tube assembly and the first end of said second tube assembly;

removing the second channel cover so as to expose the second channel and the second end of said second tube assembly;

feeding one end of the cable into the first end of the second tube assembly until the one end of the cable exits the second end of the second tube assembly within the second channel;

feeding another end of the cable into the second end of the first tube assembly until the another end of the cable exits the first end of the first tube assembly, wherein after feeding both ends of the cable into the appropriate tube assemblies the cable lays flat within the first channel;

connecting the first channel cover to the first channel;

feeding the one end of the cable through the second channel;

connecting the second channel cover to the second channel;

connecting the one end of the cable to the device; and
connecting the another end of the cable to the source.

63. The method of claim 62, wherein the another end of the cable exits the first tube assembly through the first hole and the hole in the mounting surface.

64. The method of claim 62, wherein the another end of the cable exits the first tube assembly through the second hole.

* * * * *

UNITED STATES PATENT AND TRADEMARK OFFICE
CERTIFICATE OF CORRECTION

PATENT NO. : 6,273,383 B1
DATED : August 14, 2001
INVENTOR(S) : Odd N. Oddsen Jr.

It is certified that error appears in the above-identified patent and that said Letters Patent is hereby corrected as shown below:

Title page,
Item [57], ABSTRACT, line 15, "mold" should read -- molded --.

Column 1,
Line 21, "axis" should read -- axes --.

Column 3,
Line 14, "of on arm" should read -- of an arm --.
Line 39, cancel the word "is".

Column 7,
Line 35, "there is" should read -- there are --.

Column 8,
Line 22, "off" should read -- of --.

Column 9,
Line 44, "82" should read -- 82, --.

Column 11,
Line 21, "comprise" should read -- be comprised --.
Line 54, "axis" should read -- axes --.
Line 60, cancel the word "be", second occurrence, and "102 not" should read -- 102 to not --.

Column 13,
Line 45, "mold" should read -- molded --.

Column 15,
Line 25, "34," should read -- 33, --.
Line 34, "36," should read -- 35, --.
Line 36, "36," should read -- 35, --.

UNITED STATES PATENT AND TRADEMARK OFFICE
CERTIFICATE OF CORRECTION

PATENT NO. : 6,273,383 B1
DATED : August 14, 2001
INVENTOR(S) : Odd N. Oddsen Jr.

It is certified that error appears in the above-identified patent and that said Letters Patent is hereby corrected as shown below:

Column 16,
Line 43, "slide" should read -- slid --.

Signed and Sealed this

Sixteenth Day of April, 2002

Attest:

Attesting Officer

JAMES E. ROGAN
Director of the United States Patent and Trademark Office